(12) United States Patent
Kang et al.

(10) Patent No.: US 7,835,573 B2
(45) Date of Patent: Nov. 16, 2010

(54) METHOD AND APPARATUS FOR EDGE ADAPTIVE COLOR INTERPOLATION

(75) Inventors: Moon-gi Kang, Seoul (KR); Chang-won Kim, Seoul (KR); Min-kyu Park, Seoul (KR); Young-seok Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1265 days.

(21) Appl. No.: 11/393,710

(22) Filed: Mar. 31, 2006

(65) Prior Publication Data

US 2007/0002154 A1    Jan. 4, 2007

(30) Foreign Application Priority Data

Jun. 15, 2005   (KR) ................. 10-2005-0051258

(51) Int. Cl.
*G06K 9/00* (2006.01)
*H04N 1/46* (2006.01)

(52) U.S. Cl. .................. 382/167; 382/162; 358/525

(58) Field of Classification Search .............. 382/162, 382/167, 199, 236, 300; 348/448; 358/3.15, 358/525
See application file for complete search history.

(56) References Cited

U.S. PATENT DOCUMENTS

| | | | | |
|---|---|---|---|---|
| 6,570,616 | B1* | 5/2003 | Chen | 348/272 |
| 2003/0052981 | A1* | 3/2003 | Kakarala et al. | 348/272 |
| 2004/0126037 | A1* | 7/2004 | Kim et al. | 382/300 |
| 2004/0150734 | A1 | 8/2004 | Sobel et al. | |
| 2005/0146629 | A1* | 7/2005 | Muresan | 348/280 |
| 2005/0200733 | A1* | 9/2005 | Malvar | 348/272 |

FOREIGN PATENT DOCUMENTS

| | | |
|---|---|---|
| JP | 2000244934 | 9/2000 |
| JP | 2001-258040 A | 9/2001 |

OTHER PUBLICATIONS

Su et al. ("Demosaicing of colour images using pixel level data-dependent triangulation", IEEE Proceedings of the Theory and Practice of Computer Graphics, Jun. 3-5, 2003, pp. 16-23).*

(Continued)

*Primary Examiner*—Yubin Hung
(74) *Attorney, Agent, or Firm*—Sughrue Mion, PLLC

(57) ABSTRACT

A color interpolation method and apparatus for interpolating missing color signals for each pixel of an image sensor. The color interpolation method includes forming a difference image channel by subtracting an R or B color value from a G color value in pixels adjacent to a pixel to be interpolated, detecting the direction of an edge to which the pixel to be interpolated belongs and selecting adjacent pixels to be used for color interpolation. By calculating a weight value indicating the direction of the edge and providing the weight value to the adjacent pixels to be used for color interpolation, and using the difference image values of the adjacent pixels and the weight values, a color component missing in the pixel to be interpolated can be calculated.

31 Claims, 9 Drawing Sheets

OTHER PUBLICATIONS

Pei et al. ("Effective color interpolation in CCD color filter array using signal correlation", IEEE Proc. ICIP, vol. 3, Sep. 10-13, 2000, pp. 488-491).*

Dyn et al. ("Data dependent triangulations for piecewise linear interpolation", IMA Journal of Numerical Analysis (1990) 10, pp. 137-154).*

Hur et al. ("Edge-adaptive color interpolation algorithm for progressive scan charge-coupled device image sensors", Optical Engineering 40 (12), Dec. 2001, pp. 2698-2708).*

Hirakawa et al. ("Adaptive homogeneity-directed demosaicing algorithm", IEEE Trans. on Image Processing, vol. 14, No. 3, Mar. 2005, pp. 360-369).*

* cited by examiner

<CONVENTIONAL METHOD>     <PRESENT INVENTION>

METHOD AND APPARATUS FOR EDGE ADAPTIVE COLOR INTERPOLATION

CROSS-REFERENCE TO RELATED PATENT APPLICATIONS

This application claims the benefit of Korean Patent Application No. 10-2005-0051258, filed on Jun. 15, 2005, in the Korean Intellectual Property Office, the disclosure of which is incorporated herein in its entirety by reference.

BACKGROUND OF THE INVENTION

1. Field of the Invention

The present invention relates to a color interpolation method and apparatus, and more particularly, to a color interpolation method and apparatus by which information on a color signal sensed by each pixel of an image sensor is received and color signals missing in the pixel are interpolated.

2. Description of the Related Art

Generally, a digital camera or camcorder uses an image sensor, such as a charge coupled device (CCD) or a complementary metal-oxide semiconductor (CMOS), instead of using a film. Since this sensor senses a brightness value of light, an image obtained by the sensor is not a color image, but a black and white image. Accordingly, in order to obtain a color image, a color filter array (hereinafter referred to as a "CFA") transmitting a color component of red (R), green (G), and blue (B) is disposed on each pixel of the sensor, and the pixel of the sensor senses the intensity of R, G, B color signals transmitting through the CFA. This RGB color format includes the 3 primary colors of light, and covers bandwidths of wavelength ranges to which cone cells of human eyes mainly respond, and therefore are widely used to obtain a high quality image. For broadcasting equipment, 3 CCD or CMOS sensors detecting all the R, G, and B colors are also used, but a single CCD or CMOS sensor is generally used in order to reduce cost. Since information on only one color among a plurality of channel colors is stored in each pixel of the single sensor, in order to obtain color information of a complete image, information on other channel colors that is not stored in the pixel should be interpolated from color information of neighboring pixels.

FIG. 1 illustrates a Bayer CFA. In FIG. 1, it is assumed that each square corresponds to one pixel, and number ab expressed as a subscript indicates the position (a, b) of a pixel indicating an a-th row and b-th column. For example, $B_{33}$ indicates a B color value of a pixel at a position (3,3).

In the Bayer CFA shown in FIG. 1, a variety of interpolation algorithms can be used in order to obtain R, G, and B values of each pixel. For example, as the interpolation algorithms, there are bilinear interpolation using the mean value of neighboring pixels, and smooth hue transition interpolation considering correlations of colors.

When the bilinear interpolation is used, the G color value ($G_{33}$) of a pixel (3,3) having only a B color value ($B_{33}$) can be calculated from the mean of G color values of 4 pixels that are immediately above, immediately below, immediately to the left of, and immediately to the right of the pixel (3,3), respectively, that is, $$G_{33} = \frac{G_{23} + G_{43} + G_{32} + G_{34}}{4},$$

and the R color value ($R_{33}$) can be calculated from the mean of 4 pixels adjacent to the pixel (3,3) in the diagonal directions, that is, $$R_{33} = \frac{R_{22} + R_{24} + R_{42} + R_{44}}{4}.$$

Likewise, in a pixel having only an R or G color value, other channel color values can be interpolated by using the mean values of color values of adjacent pixels having the color channel component which is desired to be interpolated.

The smooth hue transition interpolation is to perform color interpolation by using an assumption that the difference between color channels is constant in a local region of an image. That is, in the smooth hue transition interpolation, interpolation is performed by using a difference image channel ($D_R$, $D_B$) obtained by subtracting an R or B color value from a G color value. Here, $D_R$=G−R, $D_B$=G−B.

Referring FIG. 1 again, the color interpolation process using the smooth hue transition interpolation will now be explained. First, a process of interpolating a G color value in a pixel having only an R or B color value will now be explained. For example, a process of interpolating the G color value ($G_{33}$) and R color value ($R_{33}$) of a pixel (3,3) having only the B color value ($B_{33}$) is as the following. Values of difference image channels ($D_B$) of pixels (2,3), (3,2), (3,4), (4,3) that are immediately above, immediately below, immediately to the left of, and immediately to the right of the pixel (3,3), respectively, are obtained. Assuming that $D_{a,xy}$ indicates the difference of the G color value and an arbitrary a color value in pixel (x,y), the differences ($D_{B,23}$, $D_{B,32}$, $D_{B,34}$, $D_{B,43}$) between G color values and B color values in the positions (2,3), (3,2), (3,4), and (4,3) are expressed as the following:

$$D_{B,23} = G_{23} - B'_{23} = G_{23} - \frac{B_{13} + B_{33}}{2}$$

$$D_{B,32} = G_{32} - B'_{32} = G_{32} - \frac{B_{31} + B_{33}}{2}$$

$$D_{B,34} = G_{34} - B'_{34} = G_{23} - \frac{B_{33} + B_{35}}{2}$$

$$D_{B,43} = G_{43} - B'_{43} = G_{43} - \frac{B_{33} + B_{53}}{2}$$

Here, the prime symbol indicates that the color value is obtained not directly by the sensor but by interpolation. The interpolated G color value ($G_{33}$') of the pixel (3,3) is calculated by adding the mean value of the difference image channel values ($D_{B,23}$, $D_{B,32}$, $D_{B,34}$, $D_{B,43}$) and the B color value ($B_{33}$) of the pixel (3,3) to be currently interpolated. That is, $$G'_{33} = B_{33} + \frac{D_{B,23} + D_{B,32} + D_{B,34} + D_{B,43}}{4}.$$

Next, a process of interpolating other color values in a pixel having only an R or B color value will now be explained. For example, in a pixel (2,2) having only an R color value ($R_{22}$), the B color value ($B_{22}$) can be obtained by adding the mean value of the differences ($D_{B,11}$, $D_{B,13}$, $D_{B,31}$, $D_{B,33}$) of the G color values and B color values in adjacent 4 pixels (1,1), (1,3), (3,1), and (3,3) in the diagonal directions, to the G color value ($G_{22}$') of the pixel (2,2). The differences ($D_{B,11}$, $D_{B,13}$, $D_{B,31}$, $D_{B,33}$) of the G color values and B color values in the pixels (1,1), (1,3), (3,1), and (3,3) are expressed as the following:

$$D_{B,11} = G_{11}' - B_{11}, \quad D_{B,13} = G_{13}' - B_{13}$$

$$D_{B,31} = G_{31}' - B_{31}, \quad D_{B,33} = G_{33}' - B_{33}$$

Here, $G_{11}'$, $G_{13}'$, $G_{31}'$, and $G_{33}'$ can be interpolated from adjacent difference image channel values in the similar manner to the process of obtaining the interpolated G color value ($G_{33}'$) of the pixel (3,3).

The interpolated B color value ($B_{22}'$) of the pixel (2,2) can be calculated by subtracting the mean value of the difference image channel values ($D_{B,11}$, $D_{B,13}$, $D_{B,31}$, $D_{B,33}$) of the 4 pixels in the diagonal directions of the pixel (2,2) to be interpolated, from the G color value ($G_{22}'$) of the pixel (2,2). That is, $$B_{22}' = G_{22}' + \frac{D_{B,11} + D_{B,13} + D_{B,31} + D_{B,33}}{4}.$$

Next, a process of interpolating an R or B color value in a pixel having only a G color value. For example, in order to interpolate the B color value ($B_{23}$) of a pixel (2,3) having only a G color value ($G_{23}$), the mean of the difference image channel values ($D_{B,13}$, $D_{B,33}$) of pixels (1,3) and (3,3) having B color values and adjacent to the pixel (2,3) is subtracted from the G color value ($G_{23}$) of the pixel (2,3).

That is, the difference image channel values ($D_{B,13}$, $D_{B,33}$) of pixels (1,3) and (3,3) are $D_{B,13} = G_{13} - B_{13}$, $D_{B,33} = G_{33} - B_{33}$, respectively, and the interpolated B color value ($B_{23}$) of the pixel (2,3) is $$B_{23}' = G_{23} - \frac{D_{B,13} + D_{B,33}}{2}.$$

Thus, according to the smooth hue transition interpolation, the mean of difference channel values at pixel positions having information on a color channel that is desired to be interpolated is obtained and by adding the mean to or subtracting the mean from the color value of the pixel to be currently interpolated, color interpolation is performed. However, the conventional color interpolation methods do not consider edge information of an image effectively and the correlations among colors well. Accordingly, when color interpolation is performed, a color totally different from the original color is interpolated on an edge, such as the contour or boundary of an object, and there occurs a problem of a false color error that is a phenomenon in which some pixels are standing out unseemly with neighboring pixels, or a moiré effect in which colorful color distortion like a rainbow occurs in a cheque pattern image.

SUMMARY OF THE INVENTION

The present invention provides a color interpolation method and apparatus minimizing an error that can occur when color interpolation is performed by considering the direction of an edge.

The present invention also provides a color interpolation method and apparatus minimizing an error that can occur when color interpolation is performed and providing an interpolated image with a high resolution, by considering correlations of color channels.

According to an aspect of the present invention, there is provided a color interpolation method of receiving information on a color signal sensed in each pixel of a single image sensor and interpolating a color signal missing in a pixel, the method including: forming a difference image channel by subtracting an R or B color value from a G color value in each of pixels adjacent to a pixel to be interpolated; by using the difference image channel, detecting the direction of an edge to which the pixel to be interpolated belongs and selecting adjacent pixels to be used for color interpolation among adjacent pixels; calculating a weight value indicating the direction of the edge and providing the weight value to the adjacent pixels to be used for color interpolation; and by using the difference image values of the adjacent pixel to be used for color interpolation and the weight values, calculating a color component missing in the pixel to be interpolated.

According to another aspect of the present invention, there is provided a color interpolation apparatus for receiving information on a color signal sensed in each pixel of a single image sensor and interpolating a color signal missing in a pixel, the apparatus including: a difference image channel forming unit forming a difference image channel by subtracting an R or B color value from a G color value in each of pixels adjacent to a pixel to be interpolated; an edge direction detection unit detecting the direction of an edge to which the pixel to be interpolated belongs by using the difference image channel formed in the difference image channel forming unit, and selecting adjacent pixels to be used for color interpolation among adjacent pixels; a weight value calculation unit calculating a weight value indicating the direction of the edge and providing the weight value to the adjacent pixels selected in the edge direction detection unit and to be used for color interpolation; and a color interpolation unit calculating a color component missing in the pixel to be interpolated by using the difference image values of the adjacent pixel to be used for color interpolation and the weight values.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS

First, symbols to be used to explain the present invention will now be defined. $D_A$ indicates a difference image channel of an A channel color value and a G channel color value in each of pixels forming an image. Here, the A channel indicates one of an R channel or a B channel.

$D_{a,xy}$ indicates a difference image value that is the difference between the G channel color value and the a channel color value in a pixel (x,y). Here, the pixel (x,y) indicates a pixel at the x-th row and y-th column in the structure of a color filter array. $R_{xy}$, $G_{xy}$, and $B_{xy}$ indicate R, G, and B color values, respectively, which are obtained directly from the pixel (x,y), and $R_{xy}'$, $G_{xy}'$, and $B_{xy}'$ indicate interpolated R, G, and B color values, respectively, of the pixel (x,y). $\omega_{x,y}$ denotes the weight value of the pixel (x,y) to be used for color interpolation.

The present invention will now be described more fully with reference to the accompanying drawings, in which exemplary embodiments of the invention are shown.

Figures 1, 2:
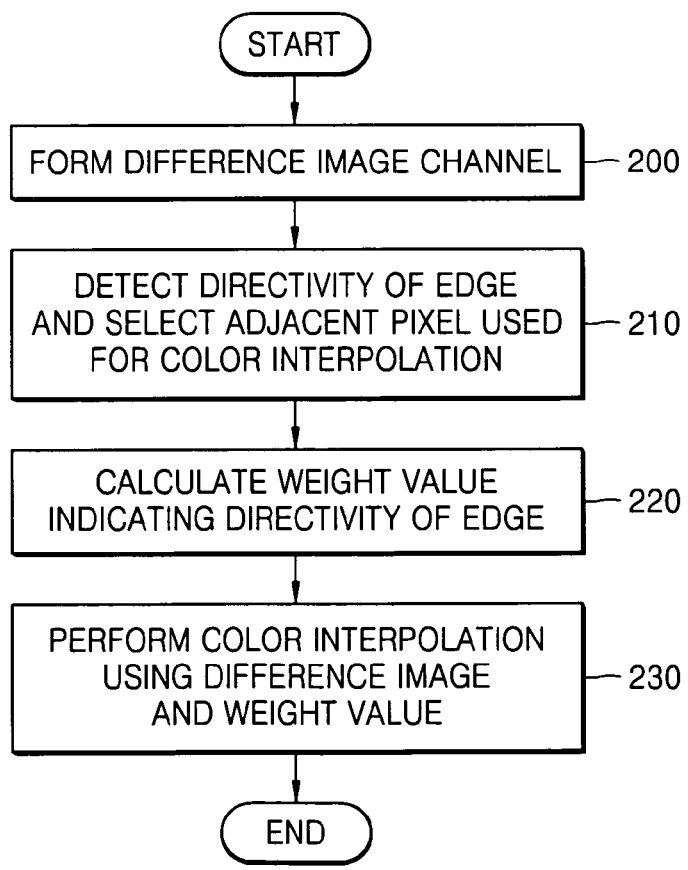
FIG. 1 illustrates an ordinary Bayer CFA.
FIG. 2 is a flowchart of a color interpolation method according to an exemplary embodiment of the present invention.

FIG. 2 is a flowchart of a color interpolation method according to an exemplary embodiment of the present invention.

As a whole, in a color interpolation method according to the present invention, color interpolation of a G channel is performed and then by using the information on the interpolated G channel, R and B channels are interpolated. Also, in the color interpolation method according to the present invention, color interpolation is not performed from the original R, G, and B channels, but from difference channels, detection of a variety of edge directions and color interpolation are performed.

Referring to FIG. 2, first, in order to perform color interpolation of a G channel, processing channels of color signals sensed in respective pixels of a single image sensor are converted. That is, difference image channels ($D_R$, $D_B$) are formed by subtracting an R or B color value from G color value of each of neighboring pixels of a pixel to be interpolated in operation 200. Here, which difference image channel of the difference image channels ($D_R$, $D_B$) is to be formed is determined according to the color component desired to be interpolated and the color component of a pixel that is to be currently interpolated.

Figure 3:
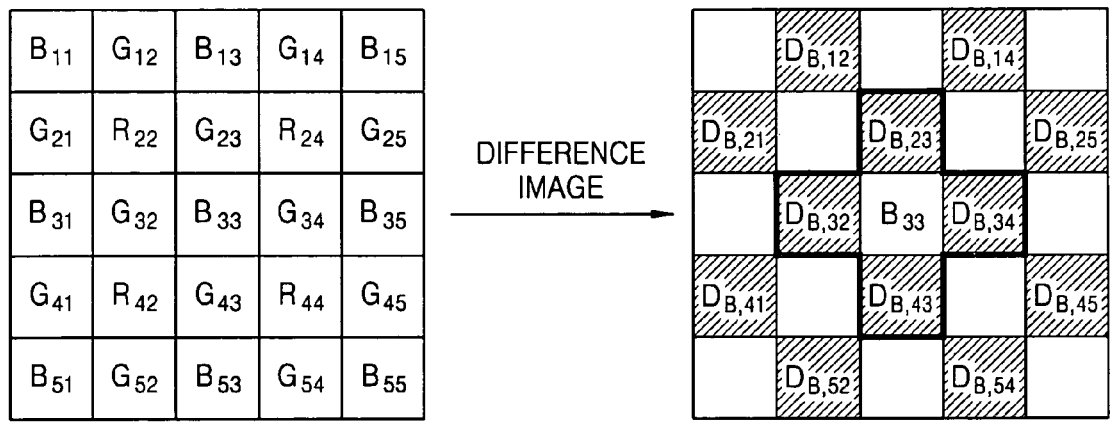
FIG. 3 illustrates a difference image used in a color interpolation method according to an exemplary embodiment of the present invention.

Referring to FIG. 3 illustrating a difference image used in a color interpolation method according to an exemplary embodiment of the present invention, a process of forming a difference image channel in order to interpolate the G color value of a pixel (3,3) having a B color value ($B_{33}$) will now be explained through an example. The G color value interpolation process in the pixel having a B color value can be identically applied to a process of interpolating a G color value in an arbitrary pixel having an R color value.

First, in order to interpolate the G color value corresponding to the pixel (3,3), difference image values ($D_{B,23}$, $D_{B,32}$, $D_{B,34}$, $D_{B,43}$) that are differences of G color values in the pixels (2,3), (3,2), (3,4), and (4,3) that are immediately above, immediately below, immediately to the left of, and immediately to the right of the pixel (3,3) to be interpolated, respectively, and the value of the B color of the pixel at the position (3,3) to be interpolated, are calculated. As will be described below, the difference of difference image values among pixels (2,3), (3,2), (3,4), and (4,3) is used to detect a first edge direction of the pixel (3,3) to be interpolated. Difference image values ($D_{B,23}$, $D_{B,32}$, $D_{B,34}$, $D_{B,43}$) in respective pixels (2,3), (3,2), (3,4), and (4,3) are as shown in the following Equation 1:

$$D_{B,23} = G_{23} - B'_{23} = G_{23} - \frac{B_{13} + B_{33}}{2} \quad (1)$$

$$D_{B,32} = G_{32} - B'_{32} = G_{32} - \frac{B_{31} + B_{33}}{2}$$

$$D_{B,34} = G_{34} - B'_{34} = G_{23} - \frac{B_{33} + B_{35}}{2}$$

$$D_{B,43} = G_{43} - B'_{43} = G_{43} - \frac{B_{33} + B_{53}}{2}$$

In addition to the pixels (2,3), (3,2), (3,4), and (4,3), difference image values ($D_{B,12}$, $D_{B,14}$, $D_{B,21}$, $D_{B,25}$, $D_{B,41}$, $D_{B,45}$, $D_{B,52}$, $D_{B,54}$) that are the differences between G color values and B color values in respective pixels (1,2), (1,4), (2,1), (2,5), (4,1), (4,5), (5,2), and (5,4) neighboring the pixel (3,3) to be interpolated are calculated. As will be described below, the difference of difference image values ($D_{B,12}$, $D_{B,14}$, $D_{B,21}$, $D_{B,25}$, $D_{B,41}$, $D_{B,45}$, $D_{B,52}$, $D_{B,54}$) of the pixels facing each other from the opposite sides of the pixel (3,3) to be interpolated is used to detect a second edge direction.

Here, the difference image values ($D_{B,12}$, $D_{B,14}$, $D_{B,21}$, $D_{B,25}$, $D_{B,41}$, $D_{B,45}$, $D_{B,52}$, $D_{B,54}$) can be calculated according to the following Equation 2:

$$D_{B,12} = G_{12} - B'_{12} = G_{12} - \frac{B_{11} + B_{13}}{2} \quad (2)$$

$$D_{B,14} = G_{14} - B'_{14} = G_{14} - \frac{B_{13} + B_{15}}{2}$$

$$D_{B,21} = G_{21} - B'_{21} = G_{21} - \frac{B_{11} + B_{31}}{2}$$

$$D_{B,25} = G_{25} - B'_{25} = G_{25} - \frac{B_{15} + B_{35}}{2}$$

$$D_{B,41} = G_{41} - B'_{41} = G_{41} - \frac{B_{31} + B_{51}}{2}$$

$$D_{B,45} = G_{45} - B'_{45} = G_{45} - \frac{B_{35} + B_{55}}{2}$$

$$D_{B,52} = G_{52} - B'_{52} = G_{23} - \frac{B_{51} + B_{53}}{2}$$

$$D_{B,54} = G_{54} - B'_{54} = G_{54} - \frac{B_{53} + B_{55}}{2}$$

Referring to FIG. 2 again, if the difference image channel is formed through the operation 200, the direction of an edge to which the pixel to be interpolated belongs is detected by using the difference image channel, and a pixel to be used for color interpolation is selected among pixels neighboring the pixel to be interpolated in operation 210.

In order to perform edge adaptive color interpolation, whether or not the pixel to be interpolated belongs to an edge should be determined and if the pixel belongs to an edge, the direction of the edge should be determined. In order to determine the presence and direction of the edge, the color interpolation method according to an exemplary embodiment of the present invention uses the absolute value of a gradient and the difference value between difference image values.

First, in order to find the direction of an edge, the two functions of the following Equation 3 are used:

$$\{D1_{m1}, D1_{m2}\} = \text{Direction1}(D_{B,23}, D_{B,32}, D_{B,34}, D_{B,43})$$

$$\{D2_{m1}, D2_{m2}\} = \text{Direction2}\{(D_{B,12}, D_{B,34}), (D_{B,14}, D_{B,52}), (D_{B,25}, D_{B,41}), (D_{B,45}, D_{B,21})\} \quad (3)$$

Here, the Direction1 function is a function for selecting 2 pixels ($D1_{m1}$, $D1_{m2}$) having a lowest difference of difference image values among pixels immediately above, immediately below, immediately to the left of, and immediately to the right of the pixel to be interpolated. A straight line connecting the selected 2 pixels ($D1_{m1}$, $D1_{m2}$) indicates the first edge direction of the pixel to be interpolated. Also, the Direction2 function is a function for selecting a pair of pixels ($D2_{m1}$, $D2_{m2}$) having a lowest difference image value among pixels facing each other from opposite sides of the pixel to be interpolated among neighboring pixels excluding the immediately adjacent pixels. A straight line connecting the selected pair of pixels ($D2_{m1}$, $D2_{m2}$) indicates the second edge direction of the pixel to be interpolated. The reason why the direction of the edge is determined by selecting the pixels having the lowest difference image value is that the difference of difference image values between pixels positioned along the direction of the edge is small.

Figure 4:
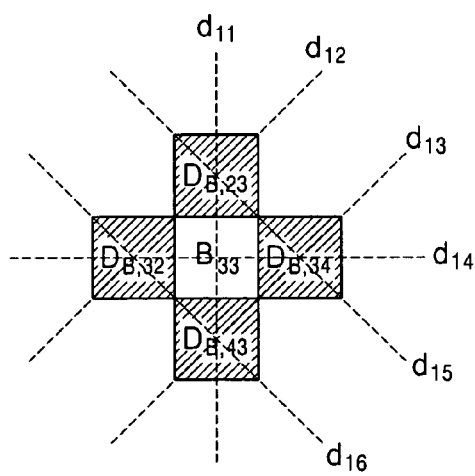
FIG. 4 is a diagram explaining a process for detecting a first edge direction of a pixel to be interpolated according to a color interpolation method of an exemplary embodiment of the present invention.

FIG. 4 is a diagram explaining a process for detecting a first edge direction of a pixel to be interpolated according to a color interpolation method of an exemplary embodiment of the present invention.

Referring to FIG. 4, two pixels ($D1_{m1}$, $D1_{m2}$) indicating the first edge direction are selected by using difference image values ($D_{B,23}$, $D_{B,32}$, $D_{B,34}$, $D_{B,43}$) in the pixels (2,3), (3,2), (3,4), and (4,3) that are immediately above, immediately below, immediately to the left of, and immediately to the right of the pixel (3,3) to be interpolated, respectively, of FIG. 3. At this time the Direction1 function of Equation 3 is used.

In the Direction1 function, two pixels ($D1_{m1}$, $D1_{m2}$) indicating the first edge direction are selected by selecting one having a lowest value among the differences between difference image values ($D_{B,23}$, $D_{B,32}$, $D_{B,34}$, $D_{B,43}$) in the pixels (2,3), (3,2), (3,4), and (4,3), that is, $|D_{B,23}-D_{B,43}|$, $|D_{B,23}-D_{B,32}|$, $|D_{B,34}-D_{B,43}|$, $|D_{B,32}-D_{B,34}|$, $|D_{B,23}-D_{B,34}|$ and $|D_{B,32}-D_{B,43}|$. For example, if $|D_{B,23}-D_{B,43}|$ has the lowest value, the direction of the edge is determined to be in the vertical direction along the straight line $d_{11}$, and pixels (2,3) and (4,3) are selected as the 2 pixels ($D1_{m1}$, $D1_{m2}$) indicating the first edge direction.

Meanwhile, the Direction2 function performs a function of complementing and modifying the first edge direction detected by the Direction1 function by considering the directions of a variety of edges that can exist in the image.

Figure 5:
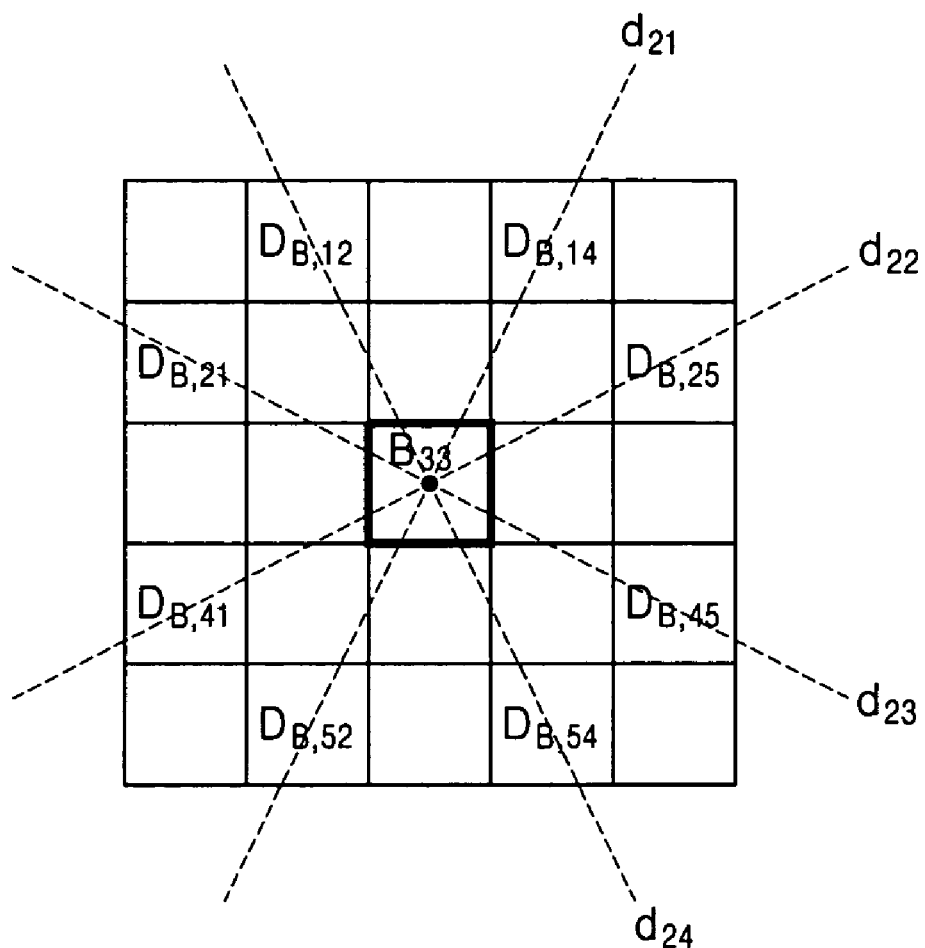
FIG. 5 is a diagram explaining a process for detecting a second edge direction according to a color interpolation method of an exemplary embodiment of the present invention.

FIG. 5 is a diagram explaining a process for detecting a second edge direction according to a color interpolation method of an exemplary embodiment of the present invention Referring to FIG. 5, a pair of pixels having a lowest difference of difference image values between pixels facing each other from the opposite sides of the pixel (3,3) to be interpolated are selected to detect the second edge direction of the pixel to be interpolated, and a pair of pixels indicating the second edge direction is determined. As described above, in order to detect the second edge direction the Direction2 function is used.

In the Direction2 function, each of the absolute value difference $|D_{B,14}-D_{B,52}|$ of difference image values of pixels (1,4) and (5,2), the absolute value difference $|D_{B,25}-D_{B,41}|$ of difference image values of pixels (2,5) and (4,1), the absolute value difference $|D_{B,45}-D_{B,21}|$ of difference image values of pixels (4,5) and (2,1), and the absolute value difference $|D_{B,12}-D_{B,54}|$ of difference image values of pixels (1,2) and (5,4) is calculated, and a straight line connecting a pair of pixels having a lowest difference is determined as the second edge direction of the pixel to be interpolated.

For example, if the $|D_{B,14}-D_{B,52}|$ is the lowest value, the direction of the second edge is determined to exist along the straight line $d_{21}$, and pixels (1,4) and (5,2) are selected as the 2 pixels ($D2_{m1}$, $D2_{m2}$) indicating the second edge direction.

Figure 6:
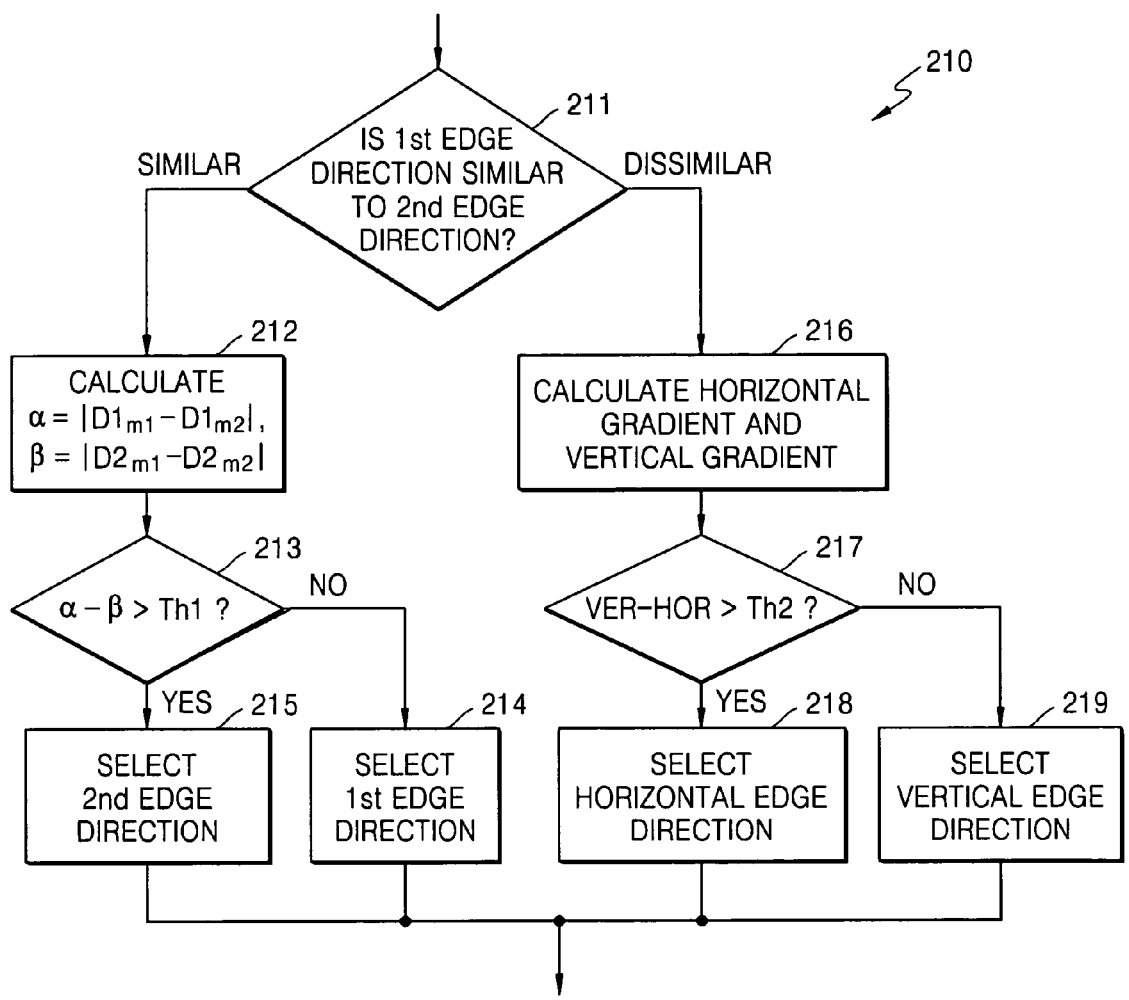
FIG. 6 is a detailed flowchart of an operation for selecting an adjacent pixel used for color interpolation of FIG. 5.

FIG. 6 is a detailed flowchart of the operation 210 for selecting an adjacent pixel used for color interpolation of FIG. 5.

If neighboring pixels indicating the first edge direction and the second edge direction are selected according to the Direction1 and Direction2 functions, which of the neighboring pixels indicating the first and second edge directions should be used for color interpolation, that is, which of the first edge direction and the second edge direction is more appropriate to the edge direction of the pixel to be interpolated should be selected.

For this, first it is determined whether or not the first edge direction and the second edge direction are similar to each other in operation 211.

For example, referring to FIGS. 4 and 5 again, if a vertical straight line $d_{11}$ is detected as the first edge direction and a straight line $d_{21}$ or $d_{24}$ close to a vertical line is detected as the second edge direction, it is determined that the first edge direction and the second edge direction are similar to each other. Also, if a horizontal straight line $d_{14}$ is detected as the first edge direction and a straight line $d_{22}$ or $d_{23}$ close to a horizontal line is detected as the second edge direction, it is determined that the first edge direction and the second edge direction are similar to each other.

However, if a vertical straight line $d_{11}$ is detected as the first edge direction and a straight line $d_{22}$ or $d_{23}$ close to a horizontal line is detected as the second edge direction, or if a horizontal straight line $d_{14}$ is detected as the first edge direction and a straight line $d_{21}$ or $d_{24}$ close to a vertical line is detected as the second edge direction, it is determined that the first edge direction and the second edge direction are not similar. As will be described below, when the first edge direction and the second edge direction are not similar, the horizontal gradient (hor) and vertical gradient (ver) of difference images are compared and one of the horizontal edge direction and the vertical edge direction is selected.

If as the result of the determination in operation 211 it is determined that the detected first edge direction and the second edge direction are similar to each other, the first edge direction coefficient ($\alpha$) that is the absolute value difference of the pixels ($D1_{m1}$, $D1_{m2}$) indicating the first edge direction and the second edge direction coefficient ($\beta$) that is the absolute value difference of the pixels ($D2_{m1}$, $D2_{m2}$) indicating the second edge direction are calculated in operation 212. The first edge direction coefficient (α) and the second edge direction coefficient (β) are calculated as in the following Equation 4:

$$\alpha = |D1_{m1} - D1_{m2}|$$

$$\beta = |D2_{m1} - D2_{m2}| \quad (4)$$

The first edge direction coefficient (α) and the second edge direction coefficient (β) are used to detect an edge direction more appropriate between the first edge direction and the second edge direction that are similar to each other.

The difference (α–β) of the first edge direction coefficient (α) and the second edge direction coefficient (β) is compared with a predetermined threshold (Th1) in operation 213. If the difference (α–β) is less than the predetermined threshold (Th1), the first edge direction is finally determined to be the edge direction to which the pixel to be interpolated belongs in operation 214, and if the difference (α–β) is greater than the predetermined threshold (Th1), the second edge direction is finally determined to be the edge direction to which the pixel to be interpolated belongs in operation 215. That is, the direction having a smaller edge direction coefficient on the basis of the threshold (Th1) is determined to be the final edge direction. If the edge direction is finally determined according to the process, pixels to be used for color interpolation are determined between the pixels ($D1_{m1}$, $D1_{m2}$) indicating the first edge direction and the pixels ($D2_{m1}$, $D2_{m2}$) indicating the second edge direction according to the finally determined edge direction.

If as the result of the determination in operation 211 it is determined that the first edge direction and the second edge direction are not similar, the horizontal gradient (hor) and the vertical gradient are calculated by using difference image values of pixels neighboring the pixel to be interpolated in operation 216. This is to correct the edge direction in order to prevent incorrect determination of the edge direction when the edge is thin.

The horizontal gradient (hor) and the vertical gradient (ver) are calculated as the following Equation 5:

$$ver = |D_{B,21} - D_{B,41}| + |D_{B,12} - D_{B,32}| + \quad (5)$$

$$|D_{B,32} - D_{B,52}| + |D_{B,23} - D_{B,43}| +$$

$$|D_{B,14} - D_{B,34}| + |D_{B,34} - D_{B,54}| + |D_{B,25} - D_{B,45}|$$

$$hor = |D_{B,12} - D_{B,14}| + |D_{B,21} - D_{B,23}| +$$

$$|D_{B,23} - D_{B,25}| + |D_{B,32} - D_{B,34}| +$$

$$|D_{B,41} - D_{B,43}| + |D_{B,43} - D_{B,45}| + |D_{B,52} - D_{B,54}|$$

As shown in Equation 5, the horizontal gradient (hor) is a value obtained by adding absolute value differences of difference image values in the horizontal direction in the difference image channel as shown in FIG. 3. The horizontal gradient (hor) is used as a basis to indicate the degree of the edge component in the horizontal direction in the entire image. Also, the vertical gradient (ver) is a value obtained by adding absolute value differences of difference image values in the vertical direction in the difference image channel. The vertical gradient (ver) is used as a basis to indicate the degree of the edge component in the vertical direction in the entire image.

Next, the difference of the horizontal gradient (hor) and the vertical gradient (ver) calculated in operation 216 is compared with a predetermined threshold (Th2) in operation 217.

If the ver–hor value that is the difference of the vertical gradient (ver) and the horizontal gradient (hor) is greater than the predetermined threshold (Th2), the horizontal edge direction is selected in operation 218 and if the ver–hor value is less than the predetermined threshold (Th2), the horizontal edge direction is selected in operation 219. In other words, if it is determined that the first edge direction and the second edge direction are not similar, the vertical gradient (ver) and the horizontal gradient (hor) of the difference image channel are calculated on the basis of the predetermined threshold (Th2), a direction having a smaller gradient value is determined as the final edge direction. If the horizontal or vertical edge direction is determined through this process, by using the difference image value of the neighboring pixels existing in the finally determined edge direction irrespective of the detected first and second edge directions, color interpolation is performed. For example, if the first edge direction and the second edge direction of the pixel (3,3) to be interpolated in FIG. 3 are not similar, and the horizontal edge direction is finally determined as the edge direction when ver–hor>Th2, color interpolation is performed by using the difference image values at pixels (3,2) and (3,4) that are pixels adjacent to the pixel (3,3) in the horizontal direction. If the vertical edge direction is determined as the final edge direction, color interpolation is performed by using the difference image values at pixels (2,3) and (4,3).

Referring to FIG. 2 again, if the direction of the edge to which the pixel to be interpolated belongs is detected from the difference image channel and adjacent pixels to be used for color interpolation are determined, a weight value indicating the direction of the edge is calculated and provided to the adjacent pixels to be used for the color interpolation in operation 220.

Figure 7:
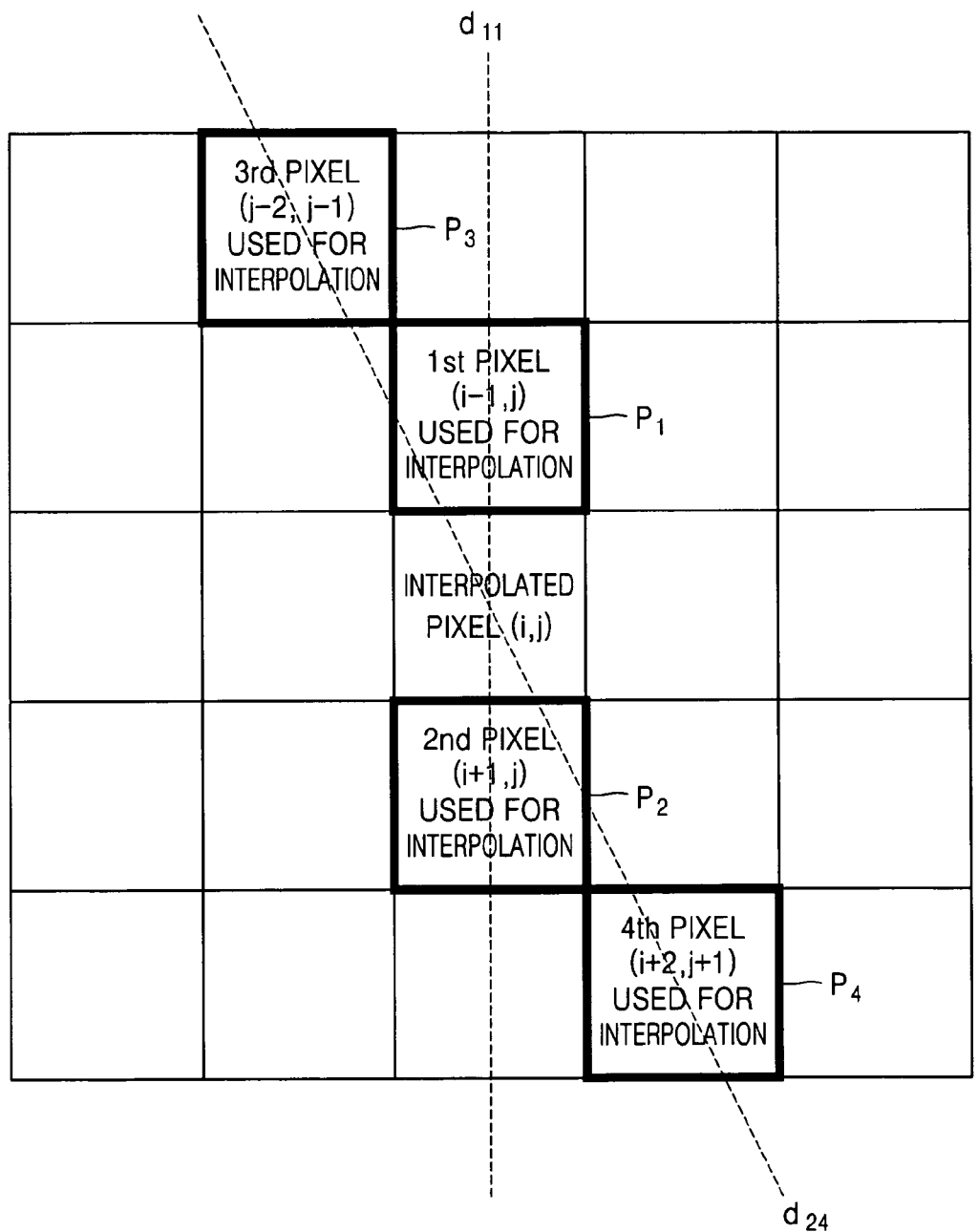
FIG. 7 is a diagram explaining a process for calculating a weight value indicating the direction of an edge and providing the weight value to adjacent pixels to be used for color interpolation according to a color interpolation method of an exemplary embodiment of the present invention.

FIG. 7 is a diagram explaining a process for calculating a weight value indicating the direction of an edge and providing the weight value to adjacent pixels to be used for color interpolation according to a color interpolation method of an exemplary embodiment of the present invention.

If the edge direction and adjacent pixels to be used for color interpolation are determined in the operation 210, a weight value indicating the direction of the edge is calculated and provided to the adjacent pixels to be used for color interpolation, and by multiplying the difference image values in the adjacent pixels by the weight value, color interpolation is performed. Assuming that the position of the pixel to be interpolated is (ij) and the position of a pixel to be used for interpolation is (x,y), the weight ($\omega_{x,y}$) of the pixel to be used for interpolation can be calculated as the following Equation 6:

$$\omega_{x,y} = \frac{2\exp(-\Delta G_{mn}/\sigma^G)\exp(-\Delta A_{mn}/\sigma^A)}{\exp(-\Delta G_{mn}/\sigma^G) + \exp(-\Delta A_{mn}/\sigma^A)} \quad (6)$$

Here, A denotes a color channel which the pixel to be interpolated has, and A is generally used to indicate any one of an R or B channel. Also, m denotes the row difference value between the position of the pixel to be interpolated and the position of the pixel to be used for interpolation, and m=i−x. Also, n denotes the column difference value between the position of the pixel to be interpolated and the position of the pixel to be used for interpolation, and n=y−j. In addition, $\Delta G_{mn} = |G_{i+m\ j+n} - G_{i-m\ j-n}|$. When the Direction1 function, that is, the weight value to be provided to the two pixels ($D1_{m1}$, $D1_{m2}$) indicating the first edge direction, is calculated, $\Delta A_{mn} = |A_{i+2m\ j+2n} - A_{ij}|$. When the Direction2 function, that is, the weight value to be provided to the two pixels ($D2_{m1}$, $D2_{m2}$) indicating the first edge direction, is calculated, $\Delta A_{mn}=|A_{i+m,j+n}'-A_{ij}|$. Also, $\sigma^G$ and $\sigma^A$ denote standard deviation of the G color channel and that of the A color channel, respectively.

As expressed in Equation 6, the weight value to be provided to the pixel to be used for interpolation is expressed as a harmonic mean of two exponential functions of the G channel and the A channel at the position to be currently interpolated. By using the harmonic mean of the two channels in the calculation of the weight value indicating the edge direction, edge information can be more efficiently reflected in the color interpolation.

FIG. 7 is a diagram explaining an example of a process for calculating the weight values of the first through fourth pixels to be used for interpolation according to the color interpolation method of an exemplary embodiment of the present invention. In FIG. 7, it is assumed that the position of a pixel to be interpolated is (i,j), and the positions of first through fourth pixels to be used for interpolation is (i−1,j) are (i−1,j), (i+1,j), (i−2,j−1), and (i+2,j+1), respectively. Also, it is assumed that the pixel (i,j) to be interpolated has a B color value. The process for calculating a weight value to be provided to a pixel to be used for color interpolation will now be explained in relation to each case of when the edge direction to which the pixel (i,j) to be interpolated belongs is detected as the first edge direction, and when it is detected as the second edge direction.

First, when the edge direction of the pixel (i,j) to be interpolated belongs is detected as the first edge direction ($d_{11}$), the weight value ($\omega_{i-1,j}$) of the first pixel ($P_1$) and the weight value ($\omega_{i+1,j}$) of the second pixel ($P_2$) indicating the first edge direction ($d_{11}$) are calculated as the following Equation 7A:

$$\omega_{i-1,j} = \frac{2\exp(-|G_{i-1,j}-G_{i+1,j}|/\sigma^G)\exp(-|B_{i+2,j}-B_{i,j}|/\sigma^B)}{\exp(-|G_{i-1,j}-G_{i+1,j}|/\sigma^G)+\exp(-|B_{i+2,j}-B_{i,j}|/\sigma^B)} \quad (7A)$$

$$\omega_{i+1,j} = \frac{2\exp(-|G_{i+1,j}-G_{i-1,j}|/\sigma^G)\exp(-|B_{i-2,j}-B_{i,j}|/\sigma^B)}{\exp(-|G_{i+1,j}-G_{i-1,j}|/\sigma^G)+\exp(-|B_{i-2,j}-B_{i,j}|/\sigma^B)}$$

Likewise, when the edge direction of the pixel (i,j) to be interpolated belongs is detected as the second edge direction ($d_{24}$), the weight value ($\omega_{i-2,j-1}$) of the third pixel ($P_3$) and the weight value ($\omega_{i+2,j+1}$) of the fourth pixel ($P_4$) indicating the second edge direction ($d_{24}$) are calculated as the following Equation 7B:

$$\omega_{i-2,j-1} = \qquad\qquad (7B)$$
$$\frac{2\exp(-|G_{i-2,j-1}-G_{i+2,j+1}|/\sigma^G)\exp(-|B'_{i-2,j-1}-B_{i,j}|/\sigma^B)}{\exp(-|G_{i-2,j-1}-G_{i+2,j+1}|/\sigma^G)+\exp(-|B'_{i-2,j-1}-B_{i,j}|/\sigma^B)}$$

$$\omega_{i+2,j+1} =$$
$$\frac{2\exp(-|G_{i+2,j+1}-G_{i-2,j-1}|/\sigma^G)\exp(-|B'_{i+2,j+1}-B_{i,j}|/\sigma^B)}{\exp(-|G_{i+2,j+1}-G_{i-2,j-1}|/\sigma^G)+\exp(-|B'_{i+2,j+1}-B_{i,j}|/\sigma^B)}$$

Here, $$B'_{i-2,j-1} = \frac{B_{i-2,j-2}+B_{i-2,j}}{2}, \text{ and } B'_{i+2,j+1} = \frac{B_{i+2,j+2}+B_{i+2,j}}{2}.$$

Referring FIG. 2 again, if the weight values to be provided to the neighboring pixels to be used for color interpolation are calculated through the operation 220, color interpolation is performed by using the weight values and the difference image values which the neighboring pixels have in operation 230.

Figure 8:
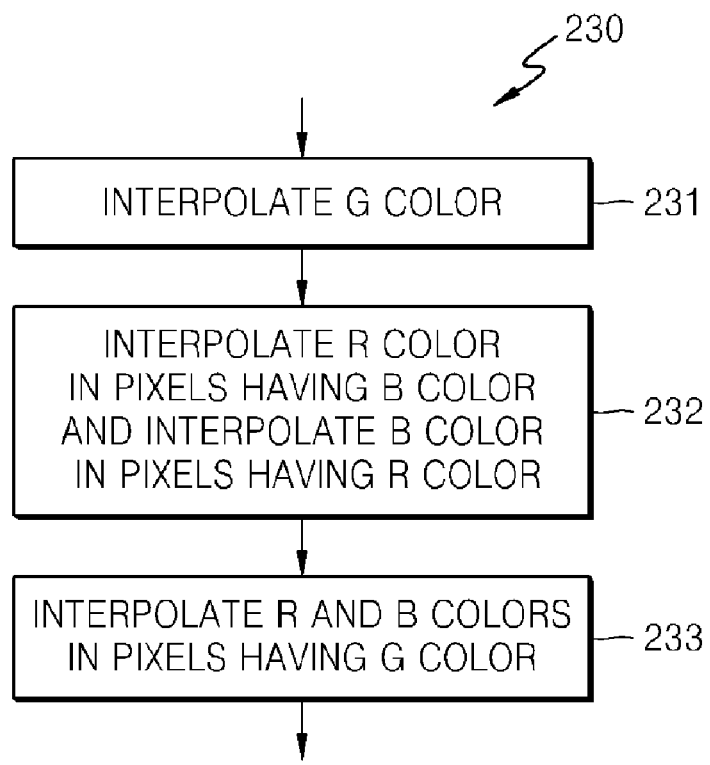
FIG. 8 is a detailed flowchart of an operation for performing color interpolation of FIG. 2.

FIG. 8 is a detailed flowchart of an operation for performing color interpolation of FIG. 2.

Referring to FIG. 8, first, by using the difference image values and weight values of the neighboring pixels, G colors in the pixels that don't have G color are interpolated in operation 231. Next, R colors in pixels each having a B color are interpolated and B colors in pixels each having an R color are interpolated in operation 232. Also, R and B colors in pixels each having a G color are interpolated in operation 233.

The operations 231 through 233 will now be explained in more detail. First, the G color interpolation process of the operation 231 will now be explained more specifically.

The G color interpolation process is divided into three cases: (A) color interpolation using the pixels ($D1_{m1},D1_{m2}$) indicating the first edge direction, (B) color interpolation using the pixels ($D2_{m1},D2_{m2}$) indicating the second edge direction, and (C) when the first edge direction and the second edge direction are not similar, color interpolation using two pixels in the horizontal or vertical direction selected among pixels immediately above, immediately below, immediately to the left of and immediately to the right of the pixel to be interpolated, respectively, by comparing the size of the horizontal gradient (hor) and that of the vertical gradient (ver).

The color interpolation (case (A)) using the pixels ($D1_{m1}$, $D1_{m2}$) indicating the first edge direction is performed when ($\alpha-\beta$) that is the difference of the first edge direction coefficient ($\alpha$) and the second edge direction coefficient ($\beta$) is less than a predetermined threshold (Th1). Weight values indicating the edge direction are provided to the pixels ($D1_{m1},D1_{m2}$) indicating the first edge direction among 4 pixels immediately above, immediately below, immediately to the left of and immediately to the right of the pixel to be interpolated, respectively, and the weighted-mean is obtained. Then, interpolation is performed such that the interpolation can be performed without crossing an edge.

As an example of the case (A), interpolation of the G color value in the pixel (3,3) will now be explained with reference to FIG. 3. Here, it is assumed that pixels indicating the first edge direction are ($D1_{m1},D1_{m2}$) and pixels (2,3) and (4,3) are selected. At this time, the interpolated G color value (G33') of the pixel (3,3) can be calculated from the following Equation 8 using the weight values of the pixels (2,3) and (4,3) and the difference image values:

$$G'_{33} = B_{33} + \frac{\omega_{2,3}D_{B,23}+\omega_{4,3}D_{B,43}}{\omega_{2,3}+\omega_{4,3}} \quad (8)$$

The color interpolation (case (B)) using the pixels ($D2_{m1}$, $D2_{m2}$) indicating the second edge direction is performed when ($\alpha-\beta$) that is the difference of the first edge direction coefficient ($\alpha$) and the second edge direction coefficient ($\beta$) is greater than the predetermined threshold (Th1).

Weight values are provided to pixels ($D2_{m1},D2_{m2}$) indicating the second edge direction among 8 neighboring pixels except the 4 pixels immediately above, immediately below, immediately to the left of and immediately to the right of the pixel to be interpolated, respectively, and the weighted-mean is obtained. Then, the interpolation is performed. As described above, the color interpolation according to the second edge direction is to prevent degradation of a picture quality that can occur when interpolation is performed with incorrect determination of an edge direction in a case where the edge is thin. This degradation occurs only in a part of the entire image but it is a most outstanding problem in a color interpolated image. Therefore, according to the present invention, by detecting the second edge direction as a complementary to the first edge direction, and correcting the wrong edge direction, an interpolated image with a high resolution can be provided.

As an example of the case (B), interpolation of the G color value in the pixel (3,3) will now be explained with reference to FIG. 3. Here, it is assumed that pixels indicating the second edge direction are $(D2_{m1}, D2_{m2})$ and pixels (1,2) and (5,4) are selected. At this time, the interpolated G color value (G33') of the pixel (3,3) can be calculated from the following Equation 9 using the weight values of the pixels (1,2) and (5,4) and the difference image values:

$$G'_{33} = B_{33} + \frac{\omega_{1,2} D_{B,12} + \omega_{5,4} D_{B,54}}{\omega_{1,2} + \omega_{5,4}} \quad (9)$$

When the first edge direction and the second edge direction are not similar, color interpolation (case (C)) using two pixels in the horizontal or vertical direction selected among pixels immediately above, immediately below, immediately to the left of and immediately to the right of the pixel to be interpolated, respectively, by comparing the size of the horizontal gradient (hor) and that of the vertical gradient (ver) is performed. As described above, when the ver–hor value that is the difference value of the vertical gradient (ver) and the horizontal gradient (hor) is greater than a predetermined threshold (Th2), color interpolation is performed in the vertical edge direction and if the ver–hor value is less than the predetermined threshold (Th2), color interpolation is performed in the horizontal edge direction.

As an example of the case (C), interpolation of the G color value in the pixel (3,3) will now be explained with reference to FIG. 3. First, when the horizontal gradient (hor) is less than the vertical gradient (ver), color interpolation is performed by using the two pixels in the horizontal direction as described above. Here, as the two pixels in the horizontal direction, pixels (3,2) and (3,4) immediately to the left of and immediately to the right of the pixel (3,3) to be interpolated, respectively, can be used. In this case, the interpolated G color value (G33') of the pixel (3,3) can be calculated from the following Equation 10 using the weight values of the pixels (3,2) and (3,4) and the difference image values:

$$G'_{33} = B_{33} + \frac{\omega_{3,2} D_{B,32} + \omega_{3,4} D_{B,34}}{\omega_{3,2} + \omega_{3,4}} \quad (10)$$

Similarly, when the vertical gradient (ver) is less than the horizontal gradient (hor), color interpolation is performed by using two pixels in the vertical direction.

Here, as the two pixels in the horizontal direction, pixels (2,3) and (4,3) immediately above and immediately below the pixel (3,3) to be interpolated, respectively, can be used. In this case, the interpolated G color value (G33') of the pixel (3,3) can be calculated from the following Equation 11 using the weight values of the pixels (2,3) and (4,3) and the difference image values:

$$G'_{33} = B_{33} + \frac{\omega_{2,3} D_{B,23} + \omega_{4,3} D_{B,43}}{\omega_{2,3} + \omega_{4,3}} \quad (11)$$

The interpolation process of the G color value can be generalized as the following.

Assuming that the position of the pixel to be interpolated is (i,j), the color channel that the pixel to be interpolated has originally is A, the positions of pixels to be used for interpolation are $(x_1, y_1)$ and $(x_2, y_2)$, respectively, the difference image values in the pixel positions to be used for interpolation are $D_{A,x1y1}$, and $D_{A,x2y2}$, , and the weight values of the pixels to be used for interpolation are $\omega_{x1,y1}$ and $\omega_{x2,y2}$, the interpolated G color value of the pixel (i,j) is calculated as the following Equation 12:

$$G'_{ij} = A_{ij} + \frac{\omega_{x1,y1} D_{A,x1y1} + \omega_{x2,y2} D_{A,x2y2}}{\omega_{x1,y1} + \omega_{x2,y2}} \quad (12)$$

Next, the method of color interpolating the R color in the pixel having the B color and the R color in the pixel having the B color will now be explained in more detail. Here, it is assumed that interpolation of the G channel has been completed already through the operation 231 described above and all pixels have G color values.

According to a color signal detected in a single image sensor after passing through a Bayer CFA, the B color is detected in a pixel positioned in the diagonal direction of a pixel from which an R color is detected, and the R color is detected in a pixel positioned in the diagonal direction of a pixel from which a B color is detected. Accordingly, in order to interpolate the B color in the pixel position where the R color is detected or in order to interpolate the R color in the pixel position where the B color is detected, color interpolation is performed by using the difference image value in the pixel positioned in the diagonal direction of the pixel to be interpolated.

The interpolation of the R color in the pixel having the B color or the B color in the pixel having the R color can be generalized and explained as the following.

Assuming that the position of the pixel to be interpolated is (i,j), the G color value of the pixel to be interpolated is $G_{ij}'$, a color channel desired to be interpolated is C, positions of pixels to be used for interpolation are (x1,y1), (x2,y2), (x3,y3), and (x4,y4), respectively, difference image values that are the differences between the G color values of the pixels to be used for interpolation and the color value desired to be interpolated are $D_{C,x1y1}$, $D_{C,x2y2}$, $D_{C,x3y3}$, and $D_{C,x4y4}$, respectively, and the weight values to be used for interpolation are $\omega_{x1,y1}$, $\omega_{x2,y2}$, $\omega_{x3,y3}$ and $\omega_{x4,y4}$, respectively, the interpolated C color value ($C_{ij}'$) of the pixel (i,j) is calculated as the following Equation 13:

$$C'_{ij} = G'_{ij} - \frac{\omega_{x1,y1} D_{C,x1y1} + \omega_{x2,y2} D_{C,x2y2} + \omega_{x3,y3} D_{C,x3y3} + \omega_{x4,y4} D_{C,x4y4}}{\omega_{x1,y1} + \omega_{x2,y2} + \omega_{x3,y3} + \omega_{x4,y4}} \quad (13)$$

Figure 9:
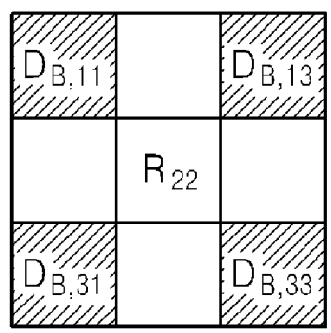
FIG. 9 is a diagram explaining an example of interpolating a B color value according to a color interpolation method of an exemplary embodiment of the present invention.

FIG. 9 is a reference diagram explaining an example of interpolating a B color value according to a color interpolation method of an exemplary embodiment of the present invention.

Referring to FIG. 9, in order to interpolate the B color value of pixel (2,2), difference image values ($D_{B,11}$, $D_{B,13}$ $D_{B,31}$, $D_{B,33}$) are calculated by calculating the difference of the G color value and B color value, which is the color channel desired to be interpolated, in each of the pixels (1,1), (1,3), (3,1), and (3,3) positioned in the diagonal direction of the pixel (2,2). The difference image values ($D_{B,11}$, $D_{B,13}$ $D_{B,31}$, $D_{B,33}$) are calculated as the following Equation 14:

$$D_{B,11}=G_{11}'-B_{11} \quad D_{B,13}=G_{13}'-B_{13}$$

$$D_{B,31}=G_{31}'-B_{31} \quad D_{B,33}=G_{33}'-B_{33} \quad (14)$$

Unlike the G channel interpolation, color interpolation of the R or B color can use the information of the G channel for which interpolation has been already finished. Accordingly, the edge is not detected separately and by using weighted-mean reflecting the edge information the color interpolation is performed. This is because most of brightness information of an image is included in the G channel, and if the interpolation of the G channel is improved, the image of the R and B channels interpolated using the G channel information is also improved. Each of the weight values of the pixels (1,1), (1,3), (3,1), and (3,3) can be calculated as the following Equation 15:

$$\omega_{1,1} = \frac{2\exp(-|G_{11}' - G_{22}'|/\sigma^G)\exp(-|B_{11} - B_{33}|/\sigma^B)}{\exp(-|G_{11}' - G_{22}'|/\sigma^G) + \exp(-|B_{11} - B_{33}|/\sigma^B)}$$

$$\omega_{1,3} = \frac{2\exp(-|G_{13}' - G_{22}'|/\sigma^G)\exp(-|B_{13} - B_{31}|/\sigma^B)}{\exp(-|G_{13}' - G_{22}'|/\sigma^G) + \exp(-|B_{13} - B_{31}|/\sigma^B)}$$

$$\omega_{3,1} = \frac{2\exp(-|G_{31}' - G_{22}'|/\sigma^G)\exp(-|B_{31} - B_{13}|/\sigma^B)}{\exp(-|G_{31}' - G_{22}'|/\sigma^G) + \exp(-|B_{31} - B_{13}|/\sigma^B)}$$

$$\omega_{3,3} = \frac{2\exp(-|G_{33}' - G_{22}'|/\sigma^G)\exp(-|B_{33} - B_{11}|/\sigma^B)}{\exp(-|G_{33}' - G_{22}'|/\sigma^G) + \exp(-|B_{33} - B_{11}|/\sigma^B)}$$

(15)

As described in the Equation 15, each of the weight values can be expressed as the harmonic mean of two exponential functions of the interpolated G channel and the B channel to be currently interpolated.

Next, by using the weight values of the pixels (1,1), (1,3), (3,1), and (3,3) and the difference image values, the B color value ($B_{22}'$) of the pixel (2,2) can be calculated according to the following Equation 16:

$$B_{22}' = G_{22}' - \frac{\omega_{1,1}D_{B,11} + \omega_{1,3}D_{B,13} + \omega_{3,1}D_{B,31} + \omega_{3,3}D_{B,33}}{\omega_{1,1} + \omega_{1,3} + \omega_{3,1} + \omega_{3,3}} \quad (16)$$

Likewise, the R color value in the pixel having the B color value can be calculated by obtaining the weighted-mean through calculation of the difference image values in the diagonal direction and the weight values, and subtracting the weighted-mean from the G color value of the pixel to be interpolated.

Next, the method of interpolating the R color and B color in the pixel having the G color in the operation 233 will now be explained in more detail.

Figure 10A:
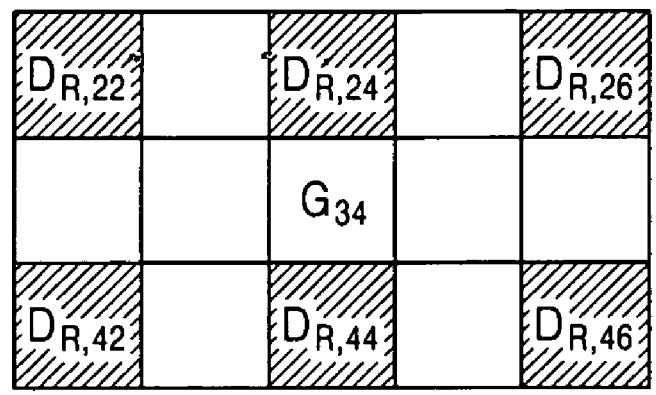
FIGS. 10A and 10B are diagrams showing neighboring pixels used for color interpolation of a pixel having G color according to a color interpolation method of an exemplary embodiment of the present invention.
Figure 10B:
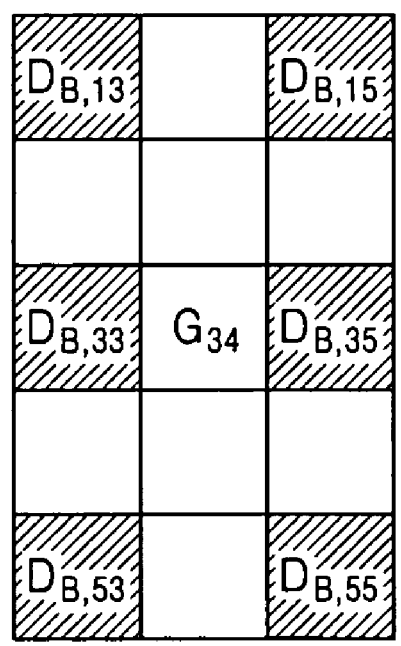

FIGS. 10A and 10B are diagrams showing neighboring pixels used for color interpolation of the pixel having G color according to a color interpolation method of an exemplary embodiment of the present invention.

Generally in the conventional color interpolation method, only color information of other channels detected in two pixels above and below, or to the left and to the right of the pixel to be interpolated is used with respect to the position of the pixel from which the G color is detected, or interpolation is performed by using information interpolated in the previous process, and using color information of four pixels. However, in the color interpolation method according to the present invention, in order to interpolate the R color and B color in the pixel having the G color, color interpolation is performed by using color information of other channels detected in six neighboring pixels, and by doing so, correlations with colors detected in the neighboring pixels are considered more efficiently.

Referring to FIG. 10A, in order to interpolate the color value ($R_{34}'$) of the R channel in the pixel (3,4) having the G color value, a mask is expanded to be 3×5 and a total of six difference image values of the neighboring pixels (2,2), (2,4), (2,6), (4,2), (4,4), and (4,6) are used. By using the difference image values of the neighboring six pixels included in the expanded mask area and the weigh values, the color value ($R_{34}'$) of the R channel in the pixel (3,4) can be calculated as the following Equation 17:

$$R_{34}' = G_{34}' - \frac{\omega_{2,2}D_{R,22} + \omega_{2,4}D_{R,24} + \omega_{2,6}D_{R,26} + \omega_{4,2}D_{B,42} + \omega_{4,4}D_{R,44} + \omega_{4,6}D_{R,46}}{\omega_{2,2} + \omega_{2,4} + \omega_{2,6} + \omega_{4,2} + \omega_{4,4} + \omega_{4,6}} \quad (17)$$

That is, as the B color interpolation in the position of the pixel having the R color, and the R color interpolation in the position of the pixel having the B color described above, by using the weighted-mean of the difference image values of the six pixels, interpolation of the R color and B color at the position of the pixel having the G color is performed. Here, the weight values can be calculated through Equation 6. Meanwhile, the size of the mask used for G color value interpolation is not limited to 3×5 and 5×3, and can be expanded further.

Figure 11:
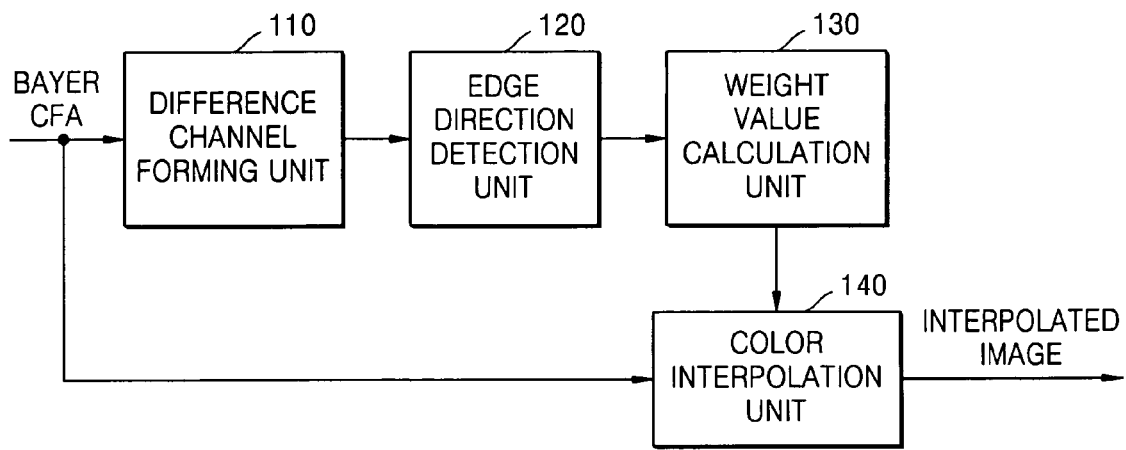
FIG. 11 is a block diagram showing the structure of a color interpolation apparatus according to an exemplary embodiment of the present invention.

FIG. 11 is a block diagram showing the structure of a color interpolation apparatus according to an exemplary embodiment of the present invention.

The color interpolation apparatus according to the present invention is an apparatus which receives information on a color signal sensed in each pixel of a single image sensor and interpolates color signals missing in the pixel according to the color interpolation method described above.

Referring to FIG. 11, the color interpolation apparatus according to an exemplary embodiment of the present invention may include a difference image forming unit 110, an edge direction detection unit 120, a weight value calculation unit 130, and a color interpolation unit 140.

The difference image channel forming unit 110 forms a difference image channel ($D_R$) obtained by subtracting an R color value from a G color value, or a difference image channel ($D_B$) obtained by subtracting a B color value from a G color value, in each of neighboring pixels of a pixel to be interpolated. Which of the difference image channels ($D_R$, $D_B$) is to be used is determined according to the color component that the pixel to be interpolated has and the type of the color component.

For example, in case where the R color is desired to be interpolated, the difference image obtained by subtracting the R color value from the G color value in each of the neighboring pixels of the pixel to be interpolated is formed. In a case where the B color is desired to be interpolated, the difference image obtained by subtracting the B color value from the G color value in each of the neighboring pixels of the pixel to be interpolated is formed. Also, in a case where the G color is desired to be interpolated, the difference image obtained by subtracting the G color value from the color component of the pixel to be currently interpolated in each of the neighboring pixels of the pixel to be currently interpolated is formed.

If the difference channel is formed by the difference image channel forming unit 110, the edge direction detection unit 120 detects the direction of an edge to which the pixel to be interpolated belongs, by using the difference image channel and selects pixels to be used for color interpolation among neighboring pixels of the pixel to be interpolated. As described above, in order to detect the edge direction, the edge direction detection unit 120 selects neighboring pixels indicating a first edge direction and a second edge direction by using the direction 1 function and direction 2 function, and selects pixels to be used for color interpolation, among the neighboring pixels indicating the first and second edge direction. The operation of the edge direction detection unit 120 is the same as explained above with reference to the operation 210 of FIG. 2, and therefore the explanation will be omitted.

If the direction of the edge to which the pixel to be interpolated belongs is detected and the neighboring pixels to be used for color interpolation are determined in the edge direction detection unit 120, the weight value calculation unit 130 calculates weight values indicating the edge direction and provides the weight values to the neighboring pixels to be used for color interpolation.

By using the difference image values formed in the difference image channel forming unit 110 and the weight values of the pixels to be used for color interpolation, which are calculated in the weight value calculation unit 130, the color interpolation unit 140 performs color interpolation of the color component missing in each pixel.

Figure 12:
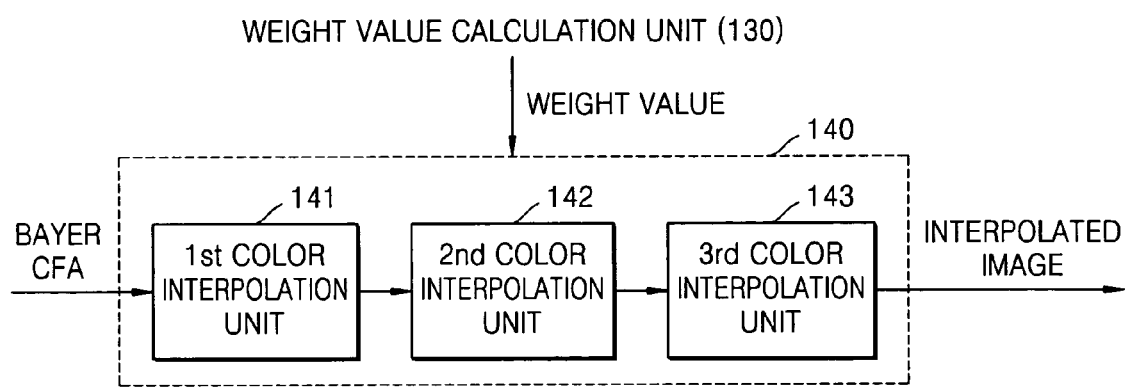
FIG. 12 is a detailed block diagram of the structure of a color interpolation unit of FIG. 1.

FIG. 12 is a detailed block diagram of the structure of the color interpolation unit 140 of FIG. 11.

Referring to FIG. 12, the color interpolation unit 140 includes a first color interpolation unit 141, a second color interpolation unit 142, and a third color interpolation unit 143. The first color interpolation unit 141 interpolates a G color in a pixel that does not have a G color, by using the difference image values of the neighboring pixels and the weight values. The second color interpolation unit 142 interpolates an R color in a pixel having a B color, and a B color in a pixel having an R color. The third color interpolation unit 143 interpolates an R color and a B color in a pixel having a G color. The operations of the first through third color interpolation units 141, 142, and 143 are the same as explained above with reference to the operations 231 through 233, respectively, of FIG. 8, and the explanation will be omitted.

Figure 13:
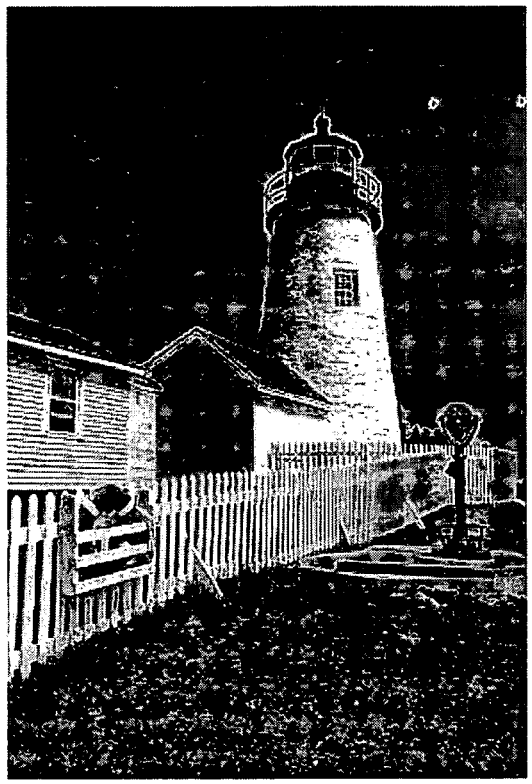
FIG. 13 illustrates the result of performing color interpolation of a lighthouse image by a color interpolation method and apparatus according to an exemplary embodiment of the present invention.
Figure 13:
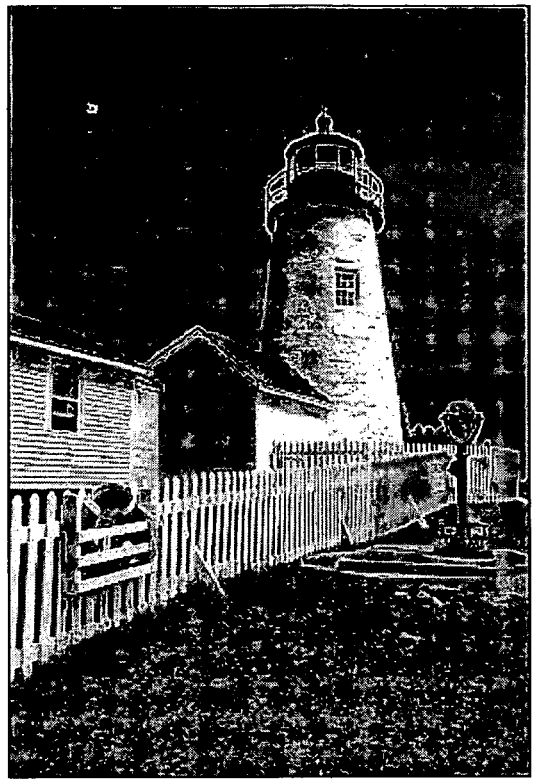

FIG. 13 illustrates the result of performing color interpolation of a lighthouse image by a color interpolation method and apparatus according to the present invention. In the result by the conventional color interpolation method, moiré effects or false color errors are found in the fence area. However, it can be confirmed that according to the color interpolation method of the present invention, errors that occurs in the area, such as a fence area, in which edges are repeatedly appearing, when the conventional color interpolation is performed, were much reduced.

According to exemplary embodiments of the present invention as described above, by considering the direction of an edge, an error that can occur during color interpolation can be minimized and an interpolated image with a high resolution can be provided.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A color interpolation method, comprising:

forming, by a difference channel forming unit, a difference image channel by subtracting an R or B color value from a G color value in each pixel adjacent to a pixel to be interpolated;

detecting, by edge direction detection unit, a direction of an edge to which the pixel to be interpolated belongs and selecting adjacent pixels to be used for color interpolation among adjacent pixels using the difference image channel;

obtaining, by a weight value calculation unit, a weight value with respect to the detected edge direction for each of the selected adjacent pixel and providing the weight value to each of the adjacent pixels used for color interpolation; and obtaining, by a color interpolation unit, a color component missing in the pixel to be interpolated using difference image values of the adjacent pixels to be used for color interpolation and the weight values, wherein the detecting of the direction of the edge to which the pixel to be interpolated belongs comprises:

detecting a first edge direction of the pixel to be interpolated using a straight line connecting two pixels selected among pixels immediately above, immediately below, immediately to the left of, and immediately to the right of the pixel to be interpolated; and detecting a second edge direction of the pixel to be interpolated using a straight line connecting two pixels facing each other from opposite sides of the pixel to be interpolated, among neighboring pixels excluding immediately adjacent pixels.

2. The method of claim 1, wherein the detecting of the direction of the edge to which the pixel to be interpolated belongs comprises:

selecting two pixels ($D1_{m1}$, $D1_{m2}$) having a lowest difference of difference image values among pixels immediately above, immediately below, immediately to the left of, and immediately to the right of the pixel to be interpolated, and detecting a straight line connecting the selected two pixels ($D1_{m1}$, $D1_{m2}$,) as a first edge direction of the pixel to be interpolated; and selecting two pixels ($D2_{m1}$, $D2_{m2}$) having a lowest difference image value among pixels facing each other from opposite sides of the pixel to be interpolated, among neighboring pixels excluding immediately adjacent pixels, and detecting a straight line connecting the selected two pixels ($D2_{m1}$, $D2_{m2}$) as a second edge direction of the pixel to be interpolated.

3. The method of claim 2, further comprising if the first edge direction is similar to the second edge direction:

obtaining a first edge direction coefficient ($\alpha$) having an absolute value difference $|D1_{m1} - D1_{m2}|$ between the two pixels ($D1_{m1}$, $D1_{m2}$) indicating the first edge; and obtaining a second edge direction coefficient ($\beta$) having an absolute value difference $|D2_{m1} - D2_{m2}|$ between the two pixels ($D2_{m1}$, $D2_{m2}$) indicating the second edge, wherein by comparing a difference of the first edge direction coefficient value ($\alpha$) and the second edge direction coefficient value (β) with a predetermined threshold (Th1), the adjacent pixels to be used for color interpolation are selected.

4. The method of claim 3, wherein if the difference α–β of the first edge direction coefficient value (α) and the second edge direction coefficient value (β) is equal to or less than the predetermined threshold (Th1), the first edge direction is determined as the edge direction of the pixel to be interpolated and the two pixels (D1$_{m1}$, D1$_{m2}$) indicating the first edge direction are determined as the adjacent pixels to be used for interpolation.

5. The method of claim 3, wherein if the difference α–β of the first edge direction coefficient value (α) and the second edge direction coefficient value (β) is greater than the predetermined threshold (Th1), the second edge direction is determined as the edge direction of the pixel to be interpolated and the two pixels (D2$_{m1}$, D2$_{m2}$) indicating the second edge direction are determined as the adjacent pixels to be used for interpolation.

6. The method of claim 2, further comprising if the first edge direction and the second edge direction are not similar:
obtaining a horizontal gradient (hor) and a vertical gradient (ver) by using the difference image values of pixels adjacent to the pixel to be interpolated; and
determining the direction of the edge to which the pixel to be interpolated belongs by comparing sizes of the vertical gradient (ver) and the horizontal gradient (hor).

7. The method of claim 6, wherein in the determining of the direction of the edge to which the pixel to be interpolated belongs, if a difference (ver–hor) of the vertical gradient (ver) and the horizontal gradient (hor) is greater than a predetermined threshold (Th2), the direction of the edge to which the pixel to be interpolated belongs is determined as a horizontal edge direction, and adjacent pixels to the left of and to the right of the pixel to be interpolated are determined as pixels to be used for interpolation.

8. The method of claim 6, wherein in the determining of the direction of the edge to which the pixel to be interpolated belongs, if a difference (ver–hor) of the vertical gradient (ver) and the horizontal gradient (hor) is less than the predetermined threshold (Th2), the direction of the edge to which the pixel to be interpolated belongs is determined as a vertical edge direction, and adjacent pixels above and below the pixel to be interpolated, respectively, are determined as adjacent pixels to be used for interpolation.

9. The method of claim 6, wherein the horizontal gradient (hor) is obtained by adding absolute value differences of the difference image values in a horizontal direction of the pixel to be interpolated, and the vertical gradient (hor) is obtained by adding absolute value differences of the difference image values in a vertical direction of the pixel to be interpolated.

10. The method of claim 1, wherein the weight value for each of the adjacent pixel to be used for interpolation is obtained by using a harmonic mean of an exponential function of a G color channel and an exponential function of a color channel of a color A desired to be interpolated.

11. The method of claim 10, wherein when it is assumed that the position of the pixel to be interpolated is (i,j), a position of a pixel to be used for interpolation is (x,y), m=i−x, n=j−y, $\Delta G_{mn}=|G_{i+mj+n}-G_{i-mj-n}|$, $\Delta A_{mn}=|A_{i+2mj+2n}-A_{ij}|$ for the calculation of the weight value with respect to the first edge direction for the pixel at (x,y), and $\Delta A_{mn}=|A_{i+mj+n}'-A_{ij}|$ for the calculation of the weight value with respect to the second edge direction for the pixel (x,y), $\sigma^G$ denotes a standard deviation of the G color channel, and $\sigma^A$ denotes a standard deviation of an A color channel, the weight value ($\omega_{x,y}$) for the pixel at (x,y) is obtained according to:

$$\omega_{x,y} = \frac{2\exp(-\Delta G_{mn}/\sigma^G)\exp(-\Delta A_{mn}/\sigma^A)}{\exp(-\Delta G_{mn}/\sigma^G)+\exp(-\Delta A_{mn}/\sigma^A)}.$$

12. The method of claim 1, wherein the obtaining of the color component missing in the pixel to be interpolated comprises:
interpolating the G color by obtaining a weighted-mean using the difference image values of the adjacent pixels selected for the color interpolation, and the weight values;
interpolating an R color of a pixel having a B color and interpolating a B color of a pixel having an R color by obtaining the weighted-mean using the difference image values of the adjacent pixels and the weight values; and
obtaining the weighted-mean using the difference image values of the adjacent pixels and the weight values, and interpolating R and B colors in a pixel having a G color.

13. The method of claim 12, wherein in the interpolating of the G color, when it is assumed that the position of the pixel to be interpolated is (i,j), the color channel that the pixel to be interpolated has originally is A, the positions of the pixels to be used for interpolation are (x$_1$,y$_1$) and (x$_2$,y$_2$), respectively, the difference image values in the pixel positions to be used for interpolation are D$_{A,x1y1}$, and D$_{A,x2y2}$, and the weight values of the pixels to be used for interpolation are $\omega_{x1,y1}$ and $\omega_{x2,y2}$, the interpolated G color value of the pixel (i,j) is obtained according to:

$$G'_{ij} = A_{ij} + \frac{\omega_{x1,y1}D_{A,x1y1} + \omega_{x2,y2}D_{A,x2y2}}{\omega_{x1,y1} + \omega_{x2,y2}}.$$

14. The method of claim 12, wherein in the interpolating of the R color in the pixel having the B color and the interpolating of the B color in the pixel having the R color, when it is assumed that the position of the pixel to be interpolated is (i,j), the G color value of the pixel to be interpolated is G$_{ij}$', the color channel desired to be interpolated is C, the positions of the pixels to be used for interpolation are (x1,y1), (x2,y2), (x3,y3), and (x4,y4), respectively, the difference image values of the pixels to be used for interpolating C color values are D$_{C,x1y1}$, D$_{C,x2y2}$, D$_{C,x3y3}$, and D$_{Cx4y4}$, respectively, and the weight values to be used for interpolation are $\omega_{x1,y1}$, $\omega_{x2,y2}$, $\omega_{x3,y3}$, and $\omega_{x4,y4}$, respectively, the interpolated C color value (C$_{ij}$') of the pixel at (i,j) is obtained according to:

$$C'_{ij} = G'_{ij} - \frac{\omega_{x1,y1}D_{C,x1y1} + \omega_{x2,y2}D_{C,x2y2} + \omega_{x3,y3}D_{C,x3y3} + \omega_{x4,y4}D_{C,x4y4}}{\omega_{x1,y1} + \omega_{x2,y2} + \omega_{x3,y3} + \omega_{x4,y4}}.$$

15. The method of claim 12, wherein in the interpolating of the R and B colors in the pixel having the G color, color interpolation is performed using the difference image values of at least six adjacent pixels included in a mask with a predetermined size and the weighted values.

16. The method of claim 15, wherein the mask with the predetermined size has a size of any one of 3×5 and 5×3.

17. A color interpolation apparatus, comprising:
a difference image channel forming unit forming a difference image channel by subtracting an R or B color value from a G color value in each of pixels adjacent to a pixel to be interpolated;

an edge direction detection unit detecting the direction of an edge to which the pixel to be interpolated belongs by using the difference image channel formed in the difference image channel forming unit, and selecting adjacent pixels to be used for color interpolation among adjacent pixels;

a weight value calculation unit obtaining a weight value with respect to the detected edge direction for each of the selected adjacent pixels; and a color interpolation unit obtaining a color component missing in the pixel to be interpolated by using the difference image values of the selected adjacent pixels and the weight values, wherein the edge direction detection unit detects a first edge direction of the pixel to be interpolated using a straight line connecting two pixels selected among pixels immediately above, immediately below, immediately to the left of, and immediately to the right of the pixel to be interpolated; and detects a second edge direction of the pixel to be interpolated using a straight line connecting two pixels facing each other from opposite sides of the pixel to be interpolated, among neighboring pixels excluding immediately adjacent pixels.

18. The apparatus of claim 17, wherein the edge direction detection unit selects two pixels ($D1_{m1}$, $D1_{m2}$) having a lowest difference of difference image values among pixels immediately above, immediately below, immediately to the left of, and immediately to the right of the pixel to be interpolated, and detects a straight line connecting the selected two pixels ($D1_{m1}$, $D1_{m2}$) as a first edge direction of the pixel to be interpolated; and selects two pixels ($D2_{m1}$, $D2_{m2}$) having a lowest difference image values among pixels facing each other from opposite sides of the pixel to be interpolated, among neighboring pixels excluding immediately adjacent pixels, and detects a straight line connecting the selected two pixels ($D2_{m1}$, $D2_{m2}$) as a second edge direction of the pixel to be interpolated.

19. The apparatus of claim 18, wherein if the first edge direction is similar to the second edge direction, the edge direction detection unit obtains a first edge direction coefficient ($\alpha$) having an absolute value difference $|D1_{m1}-D1_{m2}|$ between two pixels ($D1_{m1}$, $D1_{m2}$) indicating the first edge and a second edge direction coefficient ($\beta$) having an absolute value difference $|D2_{m1}-D2_{m2}|$ between two pixels ($D2_{m1}$, $D2_{m2}$) indicating the second edge, and by comparing a difference of the first edge direction coefficient value ($\alpha$) and the second edge direction coefficient value ($\beta$) with a predetermined threshold (Th1), selects adjacent pixels to be used for color interpolation.

20. The apparatus of claim 19, wherein if the difference $\alpha-\beta$ of the first edge direction coefficient value ($\alpha$) and the second edge direction coefficient value ($\beta$) is equal to or less than the predetermined threshold (Th1), the edge direction detection unit determines the first edge direction as the edge direction of the pixel to be interpolated and determines the two pixels ($D1_{m1}$, $D1_{m2}$) indicating the first edge direction as the adjacent pixels to be used for interpolation.

21. The apparatus of claim 19, wherein if the difference $\alpha-\beta$ of the first edge direction coefficient value ($\alpha$) and the second edge direction coefficient value ($\beta$) is greater than the predetermined threshold (Th1), the edge direction detection unit determines the second edge direction as the edge direction of the pixel to be interpolated and determines the two pixels ($D2_{m1}$, $D2_{m2}$) indicating the second edge direction as the adjacent pixels to be used for interpolation.

22. The apparatus of claim 18, wherein if the first edge direction and the second edge direction are not similar, the edge direction detection unit obtains a horizontal gradient (hor) and a vertical gradient (ver) by using the difference image values of pixels adjacent to the pixel to be interpolated, and by comparing sizes of the vertical gradient (ver) and the horizontal gradient (hor), determines a direction of an edge to which the pixel to be interpolated belongs.

23. The apparatus of claim 22, wherein if a difference (ver−hor) of the vertical gradient (ver) and the horizontal gradient (hor) is greater than a predetermined threshold (Th2), the edge direction detection unit selects the direction of the edge to which the pixel to be interpolated belongs as a horizontal edge direction, and determines adjacent pixels to the left of and to the right of the pixel to be interpolated as pixels to be used for interpolation.

24. The apparatus of claim 22, wherein if a difference (ver−hor) of the vertical gradient (ver) and the horizontal gradient (hor) is less than a predetermined threshold (Th2), the edge direction detection unit determines the direction of the edge to which the pixel to be interpolated belongs as a vertical edge direction, and determines adjacent pixels above and below the pixel to be interpolated, respectively, as adjacent pixels to be used for interpolation.

25. The apparatus of claim 22, wherein the horizontal gradient (hor) is obtained by adding absolute value differences of the difference image values in a horizontal direction of the pixel to be interpolated, and the vertical gradient (hor) is obtained by adding absolute value differences of the difference image values in a vertical direction of the pixel to be interpolated.

26. The apparatus of claim 17, wherein the weight value calculation unit obtains the weight value for each of the adjacent pixel to be used for interpolation by using a harmonic mean of an exponential function of a G color channel and an exponential function of a color channel of a color A desired to be interpolated, and provides the weight value to the selected adjacent pixels.

27. The apparatus of claim 26, wherein when it is assumed that the position of the pixel to be interpolated is (i,j), the position of a pixel to be used for interpolation is (x,y), $m=i-x$, $n=j-y$, $\Delta G_{mn}=|G_{i+mj+n}-G_{i-mj-n}|$, $\Delta A_{mn}=|A_{i+2m\,j+2n}-A_{ij}|$, for the calculation of weight values with respect to the first edge direction for the pixel at (x,y), and $\Delta A_{mn}=|A_{i+mj+n}'-A_{ij}|$ for the calculation of weight values with respect to the second edge direction for the pixel at (x,y), $\sigma^G$ denotes a standard deviation of the G color channel, and $\sigma^A$ denotes a standard deviation of an A color channel, the weight value calculation unit obtains the weight value ($\omega_{x,y}$) for the pixel at (x,y) according to:

$$\omega_{x,y} = \frac{2\exp(-\Delta G_{mn}/\sigma^G)\exp(-\Delta A_{mn}/\sigma^A)}{\exp(-\Delta G_{mn}/\sigma^G)+\exp(-\Delta A_{mn}/\sigma^A)}.$$

28. The apparatus of claim 17, wherein the color interpolation unit comprises:

a first color interpolation unit interpolating the G color by obtaining a weighted-mean using the difference image values in the selected adjacent pixels and the weight values;

a second color interpolation unit interpolating an R color of a pixel having a B color and interpolating a B color of a pixel having an R color by obtaining the weighted-mean using the difference image values of the selected adjacent pixels and the weight values; and a third color interpolation unit obtaining the weighted-mean using the difference image values in the selected adjacent pixels and the weight values, and interpolating R and B colors in a pixel having a G color.

29. The apparatus of claim 28, wherein when it is assumed that the position of the pixel to be interpolated is (i,j), the color channel that the pixel to be interpolated has originally is A, the positions of the pixels to be used for interpolation are $(x_1,y_1)$ and $(x_2,y_2)$, respectively, the difference image values in the pixel positions to be used for interpolation are $D_{A,x1y1}$ and $D_{A,x2y2}$, and the weight values of the pixels to be used for interpolation are $\omega_{x1,y1}$ and $\omega_{x2,y2}$, the first color interpolation unit obtains an interpolated G color value of the pixel at (i,j) according to:

$$G'_{ij} = A_{ij} + \frac{\omega_{x1,y1} D_{A,x1y1} + \omega_{x2,y2} D_{A,x2y2}}{\omega_{x1,y1} + \omega_{x2,y2}}.$$

30. The apparatus of claim 28, wherein when it is assumed that the position of the pixel to be interpolated is (i,j), the G color value of the pixel to be interpolated is $G_{ij}'$, the color channel desired to be interpolated is C, the positions of the pixels to be used for interpolation are (x1,y1), (x2,y2), (x3, y3), and (x4,y4), respectively, the difference image values of the pixels to be used for interpolating C color values are $D_{C,x1y1}$, $D_{C,x2y2}$, $D_{C,x3y3}$, and $D_{C,x4y4}$, respectively, and the weight values to be used for interpolation are $\omega_{x1,y1}$, $\omega_{x2,y2}$, $\omega_{x3,y3}$, $\omega_{x4,y4}$, respectively, the second color interpolation unit obtains the interpolated C color value ($C_{ij}'$) of the pixel at (i,j) according to:

$$C'_{ij} = G'_{ij} - \frac{\omega_{x1,y1} D_{C,x1y1} + \omega_{x2,y2} D_{C,x2y2} + \omega_{x3,y3} D_{C,x3y3} + \omega_{x4,y4} D_{C,x4y4}}{\omega_{x1,y1} + \omega_{x2,y2} + \omega_{x3,y3} + \omega_{x4,y4}}.$$

31. The apparatus of claim 28, wherein the third color interpolation unit performs color interpolation using the difference image values of at least six adjacent pixels included in a mask with a predetermined size and the weighted values.

* * * * *